(12) United States Patent
Harada et al.

(10) Patent No.: US 7,684,613 B2
(45) Date of Patent: Mar. 23, 2010

(54) METHOD AND SYSTEM FOR ALIGNING THREE-DIMENSIONAL SHAPE DATA FROM PHOTOGRAMMETRY DATA AND THREE-DIMENSIONAL MEASUREMENT DATA USING TARGET LOCATIONS AND SURFACE VECTORS

(75) Inventors: Koji Harada, Sakai (JP); Yoshihisa Abe, Sakai (JP); Takayuki Mukai, Sakai (JP)

(73) Assignee: Konica Minolta Sensing, Inc., Sakai-shi (JP)

( * ) Notice: Subject to any disclaimer, the term of this patent is extended or adjusted under 35 U.S.C. 154(b) by 974 days.

(21) Appl. No.: 11/439,338

(22) Filed: May 23, 2006

(65) Prior Publication Data

US 2006/0269124 A1    Nov. 30, 2006

(30) Foreign Application Priority Data

May 27, 2005    (JP)    ............................. 2005-154820

(51) Int. Cl.
*G06K 9/00* (2006.01)
*G01C 11/12* (2006.01)
*G01C 3/00* (2006.01)

(52) U.S. Cl. ...................... 382/154; 382/106; 702/152; 348/135; 356/2; 356/3

(58) Field of Classification Search .............. 382/103, 382/106, 108, 154, 291, 294–296; 345/419, 345/420; 702/152, 153, 159; 348/135; 356/2, 356/3

See application file for complete search history.

(56) References Cited

U.S. PATENT DOCUMENTS

| | | | |
|---|---|---|---|
| 5,991,437 A * | 11/1999 | Migdal et al. ............... | 382/154 |
| 6,330,523 B1 * | 12/2001 | Kacyra et al. ............... | 702/159 |
| 6,590,669 B1 * | 7/2003 | Wagner ...................... | 356/601 |
| 2005/0069188 A1 * | 3/2005 | Rubbert et al. .............. | 382/128 |
| 2006/0061566 A1 * | 3/2006 | Verma et al. ................ | 345/419 |

OTHER PUBLICATIONS

Beraldin, J.A. (Jul. 2004) "Integration of laser scanning and close-range photogrammetry—the last decade and beyond." Proc. XXth Int'l Soc. for Photogrammetry and Remote Sensing (ISPRS) Congress, Comm. VII, pp. 972-983.*

(Continued)

*Primary Examiner*—Aaron W Carter
*Assistant Examiner*—Barry Drennan
(74) *Attorney, Agent, or Firm*—Sidley Austin LLP

(57) ABSTRACT

In a method for aligning three-dimensional shape data obtained by performing a three-dimensional measurement of an object, photogrammetry of the object with a target mark is performed to obtain a three-dimensional position and a normal vector of the target mark by a calculation, and the three-dimensional measurement of the object is performed to obtain a three-dimensional position and a normal vector of the target mark. Then, determined is a correspondence between the three-dimensional position of the target mark obtained by the photogrammetry and the three-dimensional position of the target mark obtained by the three-dimensional measurement, by using the three-dimensional position and the normal vector of the target mark obtained by the photogrammetry and those of the target mark obtained by the three-dimensional measurement, and three-dimensional shape data obtained by the three-dimensional measurement is aligned based on the correspondence between the three-dimensional-positions of the target marks.

7 Claims, 11 Drawing Sheets

OTHER PUBLICATIONS

Guidi et al. (Mar. 2004) "High-accuracy 3-d modeling of cultural heritage: the digitizing of Donatello's 'Maddalena'." IEEE Trans. on Image Processing, vol. 13 No. 3, pp. 370-380.*

Pothou et al. (May 2006) "Assessment and comparison of registration algorithms between aerial images and laser point clouds." Proc. ISPRS Comm. I Symposium, WG 1/2 Part A.*

El-Hakim et al. (Nov. 2003) "Visualization of highly textured surfaces." Proc. 4th Int'l Symposium on Virtual Reality, Archaeology, and Intelligent Cultural Heritage, pp. 231-240.*

Ronnholm et al. (Sep. 2007) "Integration of laser scanning and photogrammetry." Proc. ISPRS Workshop on Laser Scanning and SilviLaser, Part 3 / W52, pp. 355-362.*

Remondino et al. (Sep. 2006) "Image-based 3d modelling: a review." The Photogrammetric Record, vol. 21 No. 115, pp. 269-291.*

Dr. Ing. Aloyes Wehr, Albert Wiedemann, "Fusion of Photogrammetric and Laser Scanner Data", Oct. 1999 (5 pages).

* cited by examiner

Fig.7

| SKg No. | vertex 1 | | | vertex 2 | | | vertex 3 | | | surface normal vector | error value | HK |
|---|---|---|---|---|---|---|---|---|---|---|---|---|
| | coordinates | normal vector | coincidence | coordinates | normal vector | coincidence | coordinates | normal vector | coincidence | | | |
| 1 | | | | | | | | | | | | |
| 2 | | | | | | | | | | | | |
| 3 | | | | | | | | | | | | |

SL1

METHOD AND SYSTEM FOR ALIGNING THREE-DIMENSIONAL SHAPE DATA FROM PHOTOGRAMMETRY DATA AND THREE-DIMENSIONAL MEASUREMENT DATA USING TARGET LOCATIONS AND SURFACE VECTORS

CROSS-REFERENCE TO RELATED APPLICATION

This application is based on Japanese Patent Application No. 2005-154820 filed in Japan on May 27, 2005, the entire content of which is hereby incorporated by reference.

BACKGROUND OF THE INVENTION

1. Field of the Invention

The present invention relates to a method and an apparatus for aligning three-dimensional shape data obtained by performing a three-dimensional measurement of an object, by using target marks provided on the object.

2. Description of the Related Art

A three-dimensional measurement in a noncontact manner is frequently performed to obtain three-dimensional shape data of objects. Examples of the three-dimensional measurement include passive types such as a lens focus method and a stereo image method and active types such as an optical radar method and a light projection method. According to the stereo image method, the object is photographed from a plurality of different positions, for example, by a camera, and from the obtained images, the three-dimensional coordinates of each point on the object are calculated based on the principle of triangulation. This method is also called photogrammetry, because the three-dimensional coordinates are obtained by photographing the object. According to the light projection method, detection light is projected onto the object, and the reflected light from the object is received by an image sensor. A method using slit light as the detection light is a slit light projection method (also called a light-section method). According to the slit light projection method, slit light is deflected to optically scan the object, and from the degree of deformation of the slit light based on the surface configuration of the object, the three-dimensional coordinates of each point on the object are calculated based on the principle of triangulation.

To obtain complete three-dimensional shape data of one object, it is necessary to perform the three-dimensional measurement of the object from different positions a plurality of number of times and combine the obtained pieces of three-dimensional shape data into one piece. In particular, with active-type three-dimensional measurement instruments (three-dimensional digitizers), since the viewing angle is limited, there are cases where the entire object does not fall within the visual field of one measurement. For this reason, it has conventionally been performed to perform the measurement of the object part by part and combine the obtained pieces of three-dimensional shape data into one three-dimensional model.

In combining a plurality of pieces of three-dimensional shape data, it is necessary to align them. For the alignment of the three-dimensional shape data, it is performed to paste a multiplicity of target marks on the object and perform alignment based on the target coordinates which are the three-dimensional coordinate positions of the target marks.

However, in a case where the alignment is performed based on only the target coordinates like the conventional method, when there are a plurality of target coordinates in a similar positional relationship, there are cases where which target coordinates are correspondent cannot be found.

For example, in a case where six target marks TM are provided on an object Q as shown in FIG. 14(A), when the triangles of two groups A and B each including three target marks TM surrounded by a chain line are similar to each other, these cannot be distinguished from each other. In this example, as shown in FIG. 14 (B), the two triangles of the groups A and B are mirror symmetric and the correspondences among the target marks TM coincide with each other, so that it is difficult to distinguish these from each other. Consequently, there is a possibility that the pieces of three-dimensional shape data are erroneously aligned.

As mentioned above, the conventional method has a problem that the robustness in determining the correspondence among the target coordinates is low. To solve this problem, it is considered to irregularly paste the target marks TM when providing them on the object Q or increase the number of target marks TM. However, since irregularly pasting the target marks TM is difficult to quantify and is, in a large measure, know-how, depending only on it is a problem. When the number of target marks TM is increased, since the area of the object hidden by the target marks TM is increased, a new problem arises that the quality of the measured three-dimensional shape data is degraded.

SUMMARY OF THE INVENTION

A principal object of the present invention is to provide a method or an apparatus capable of accurately aligning three-dimensional shape data obtained by performing a three-dimensional measurement of an object.

Another object of the present invention is to provide a method or an apparatus capable of improving the robustness in determining the correspondence among the target marks when the alignment of the three-dimensional shape data obtained by performing the three-dimensional measurement of the object is performed.

The above-mentioned objects of the present invention are attained by providing a method for aligning three-dimensional shape data obtained by performing a three-dimensional measurement of an object, the method comprising the steps of:

A method for aligning three-dimensional shape data obtained by performing a three-dimensional measurement of an object, the method comprising the steps of:

providing a target mark on the object;

performing photogrammetry of the object to obtain a three-dimensional position and a normal vector of the target mark by a calculation;

performing the three-dimensional measurement of the object to obtain a three-dimensional position and a normal vector of the target mark;

determining a correspondence between the three-dimensional position of the target mark obtained by the photogrammetry and the three-dimensional position of the target mark obtained by the three-dimensional measurement, by using the three-dimensional position and the normal vector of the target mark obtained by the photogrammetry and the three-dimensional position and the normal vector of the target mark obtained by the three-dimensional measurement; and aligning three-dimensional shape data obtained by the three-dimensional measurement based on the correspondence between the three-dimensional positions of the target marks.

The above-mentioned objects of the present invention are also attained by providing an apparatus for aligning three-dimensional shape data obtained by performing a three-dimensional measurement of an object, the apparatus comprising:

a first calculator that calculates a three-dimensional position and a normal vector of a target mark based on image data obtained by performing photogrammetry of an object provided with the target mark;

a second calculator that calculates a three-dimensional position and a normal vector of the target mark based on three-dimensional shape data obtained by performing a three-dimensional measurement of the object;

a determiner that determines a correspondence between the three-dimensional position calculated by the first calculator and the three-dimensional position calculated by the second calculator, by using the three-dimensional position and the normal vector calculated by the first calculator and the three-dimensional position and the normal vector calculated by the second calculator; and a transformer that performs a coordinate transformation of the three-dimensional shape data obtained by the three-dimensional measurement so as to coincide with the three-dimensional position obtained by the photogrammetry.

These and other objects, advantages and features of the invention will become apparent from the following description thereof taken in conjunction with the accompanying drawings, which illustrate specific embodiments of the invention.

BRIEF DESCRIPTION OF DRAWINGS

These and other objects, advantages and features of the invention will become apparent from the following description thereof taken in conjunction with the accompanying drawings in which:

FIG. 7 is a view showing an example of a triangle list;

DESCRIPTION OF THE PREFERRED EMBODIMENTS

Hereinafter, an embodiment of the present invention will be described with reference to the drawings.

Figure 1:
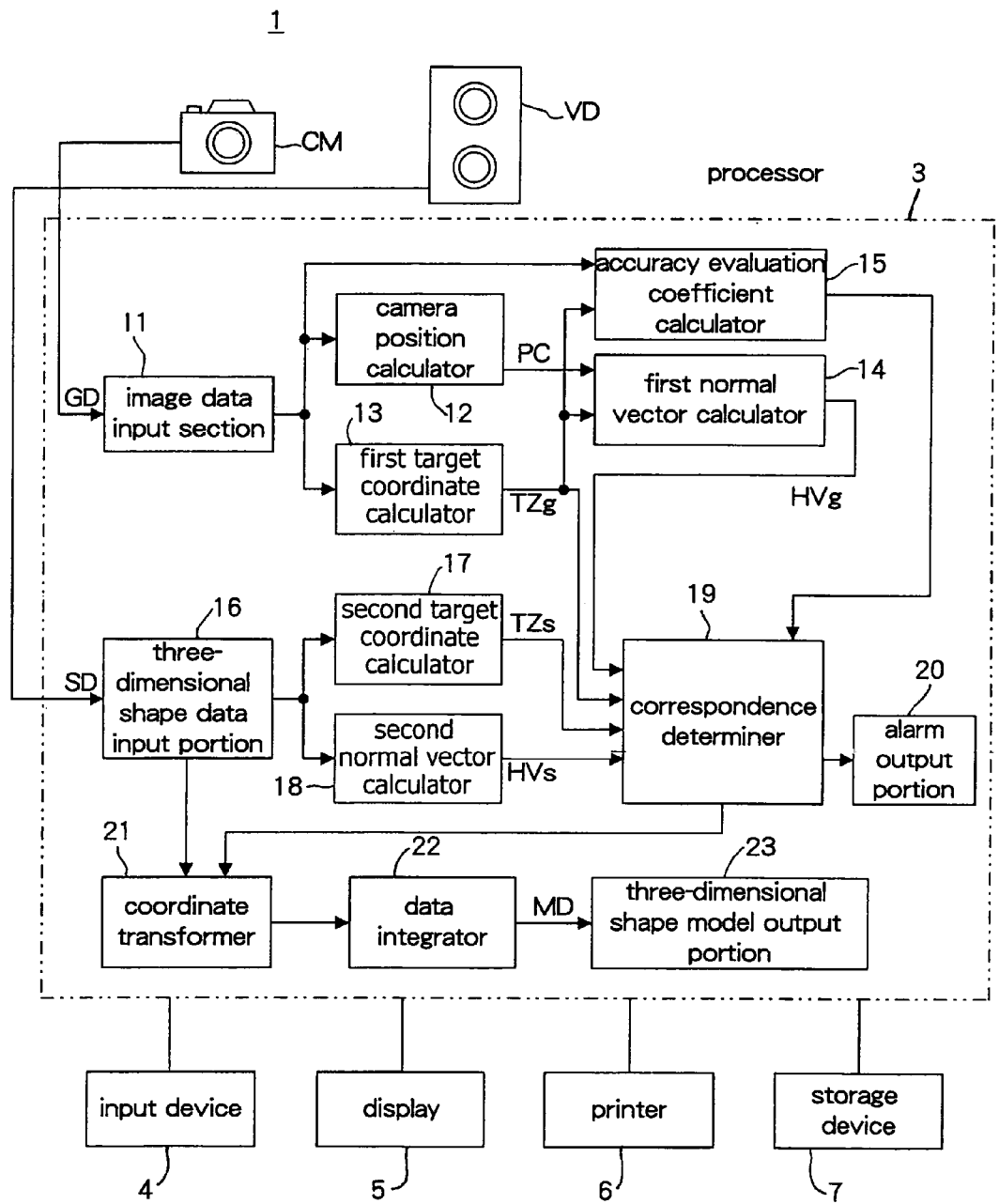
FIG. 1 is a block diagram showing a three-dimensional shape model generating system according to the present invention.

In FIG. 1, a three-dimensional shape model generating system 1 includes a camera CM, a three-dimensional measurement instrument VD, a processor 3, an input device 4, a display 5, a printer 6 and a storage device 7.

Figure 2:
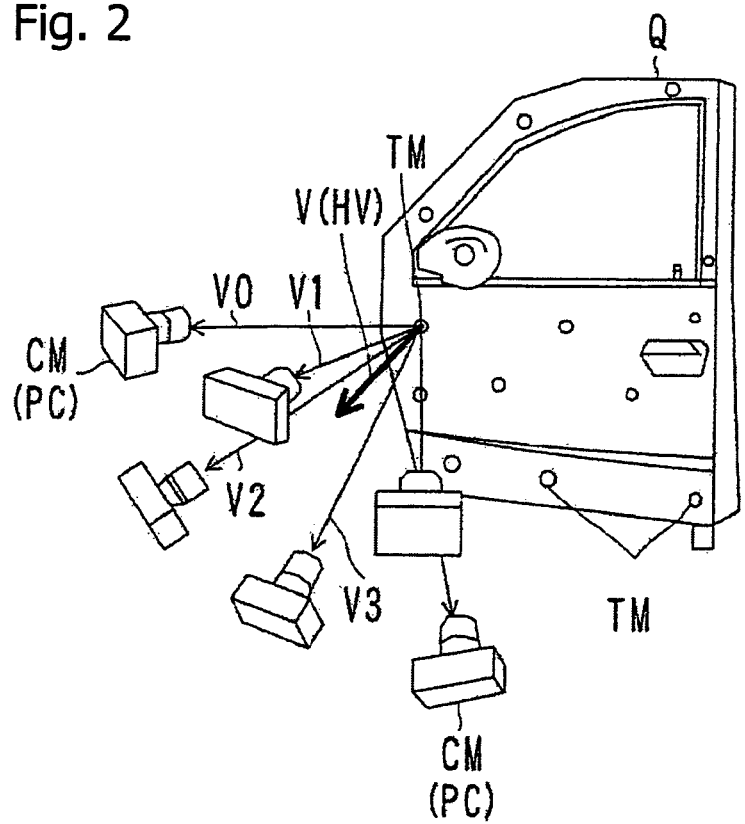
FIG. 2 is a view showing a manner of capturing an image of an object by a digital camera.

The camera CM is used for photogrammetry, and by one image capturing, one piece of image data on the whole or a part of the object is obtained. As shown in FIG. 2, image capturing of one object Q is evenly performed a plurality of number of times from various points of view while the image capturing position and direction are changed. To the object Q, target marks TM are pasted in appropriate positions. The visual field and the position of the camera CM are determined so that at least three target marks TM are taken in one image capturing. The target marks TM are each a circle or a circumferential line with a diameter of several mm to appropriately 1 cm drawn on the surface of a sheet, and the sheet is pasted to the surface of the object Q by an adhesive or the like.

In the image capturing by the camera CM, while normally, a person holds the camera CM with his or her hands to perform image capturing, image capturing may be automatically performed with the camera CM being moved by a manipulator or the like. In the example shown in FIG. 2, the object Q is a door of a car, and with respect to both the obverse side and the reverse side of the door, the image capturing is performed a plurality of number of times. As the camera CM, digital cameras that obtain digital still image data, digital video cameras that obtain moving images and various other cameras may be used. As the camera CM, one including one camera or one including two cameras or three or more cameras may be used.

Figure 4:
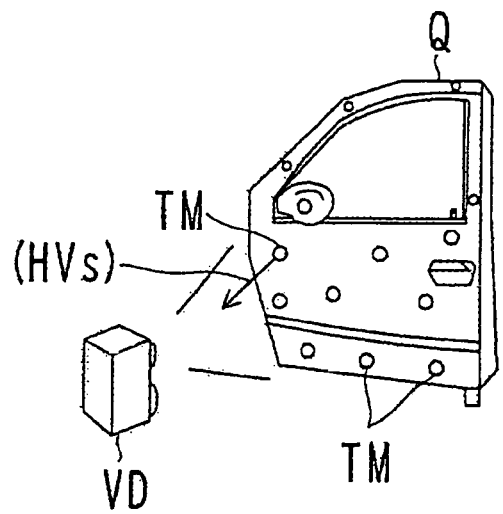
FIG. 4 is a view showing a manner of performing a three-dimensional measurement of the object by a three-dimensional measurement instrument.

The three-dimensional measurement instrument VD is used for the three-dimensional measurement of the object Q. In the present embodiment, an active three-dimensional measurement instrument according to the slit light projection method is used. As shown in FIG. 4, the entire surface of the object Q is measured a plurality of number of times by the three-dimensional measurement instrument VD to obtain the three-dimensional shape data of each part of the surface of the object Q. The visual field and the position of the three-dimensional measurement instrument VD are determined so that at least three target marks TM are included in one piece of three-dimensional shape data SD.

The processor 3 generates a three-dimensional shape model MD representative of the entire surface shape of the object Q based on the image data-GD outputted from the camera CM and the three-dimensional shape data SD outputted from the three-dimensional measurement instrument VD. As the processor 3, a personal computer may be used. Although not shown, the processor 3 is connected to a network via an appropriate interface, and is capable of communicating with other processors, personal computers and servers.

The input device 4 is for providing the processor 3 with instructions to input data and the like. As the input device 4, a keyboard, a mouse or a touch panel is used.

The display 5 is for displaying the inputted image data GD and three-dimensional shape data SD, the generated three-dimensional shape model MD, various pieces of data under calculation processing, and other images and messages. As the display 5, an LCD, a PDP or a CRT is used.

The printer 6 is for printing various pieces of data, images, messages and the like. The storage device 7 stores the inputted image data GD and three-dimensional shape data SD, the generated three-dimensional shape model MD, various pieces of data under calculation processing, other images, data, and programs.

The processing performed by the processor 3 will be described in detail.

Returning to FIG. 1, the processor 3 is provided with an image data input portion 11, a camera position calculator 12, a first target coordinate calculator 13, a first normal vector (average sight line vector) calculator 14, an accuracy evaluation coefficient calculator 15, a three-dimensional shape data input portion 16, a second target coordinate calculator 17, a second normal vector calculator 18, a correspondence determiner 19, an alarm output portion 20, a coordinate transformer 21, a data integrator 22, and a three-dimensional shape model output portion 23.

The image data input portion 11 receives the image data GD from the camera CM, and stores it into an appropriate memory area or the storage device 7.

The camera position calculator 12 calculates, based on a plurality of pieces of image data GD, the camera position PC when the pieces of image data GD are taken. The first target coordinate calculator 13 calculates the target coordinates TZg of the target marks TM which are the three-dimensional coordinate positions of the target marks TM based on a plurality of pieces of image data GD including the target marks TM. The first normal vector calculator 14 calculates the normal vectors HVg of the target marks TM based on the camera position PC and the target coordinates TZg. The camera position PC and the target coordinates TZg can be obtained by the use of a collinear condition which is a known method of photogrammetry.

The normal vector HVg can be obtained from the camera position PC and the target coordinate TZg.

That is, to obtain the normal vector HVg, for example, the sight line vectors V0, V1, V2, V3, . . . from the position of the target coordinates TZg toward the camera positions PC are obtained. Then, the average vector V of the sight line vectors toward the camera positions PC is obtained, and this is designated the normal vector HVg of the target mark TM.

That is, as shown in FIG. 2, the sight lines from one target mark TM toward the camera positions where the image capturing of the target mark TM is performed are designated the sight line vectors V0, V1, V2, V3, . . . , and the average vector V which is the average of the sight line vectors V0, V1, V2, V3, . . . is designated the normal vector HVg.

As described above, the normal vector obtained by performing photogrammetry may be called "average sight line vector" because it is defined by the average of the sight line vectors unlike a geometric normal vector (that is, a vector vertically extending from the central position of the target).

The accuracy evaluation coefficient calculator 15 obtains an evaluation coefficient HK related to the accuracy of the three-dimensional position of the target mark TM obtained by photogrammetry, that is, the target coordinates TZg calculated by the first target coordinate calculator 13.

As a method of obtaining the evaluation coefficient HK, for example, all the sight line vector pairs selected from among the sight line vectors V0, V1, V2, V3, . . . are obtained. The angle α between the two sight lines vectors of each pair is obtained. The largest one of the obtained angles α is designated θ. The angle θ is a parameter representative of the measurement accuracy, and is an example of the evaluation coefficient HK referred to here. The range of the angle α is 0 to 90 degrees.

Figure 8:
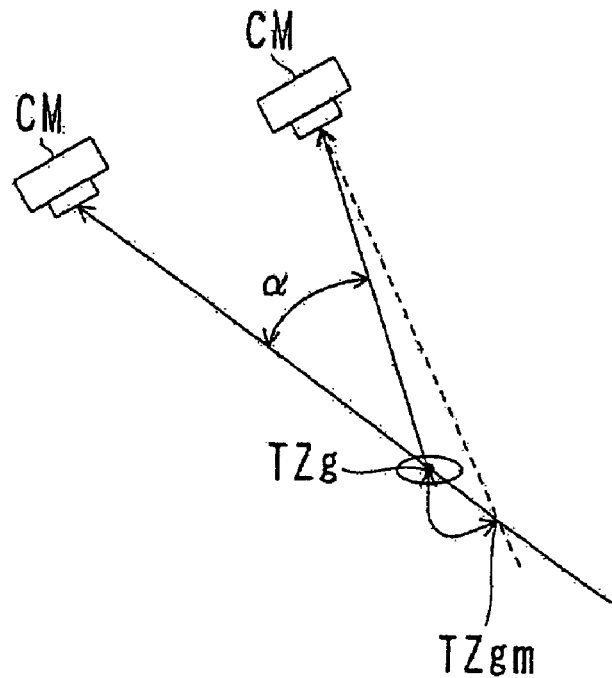
FIGS. 8(A) and 8(B) are views for respectively explaining the measurement accuracy.
Figure 8:
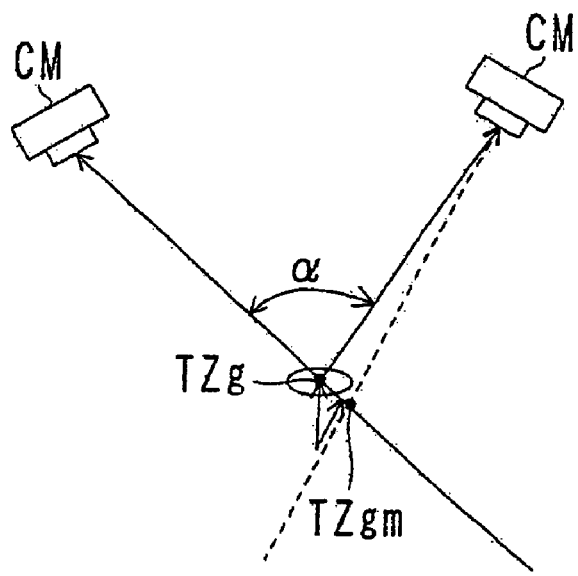

That is, as shown in FIGS. 8(A) and 8(B), to accurately obtain the target coordinates TZg in photogrammetry, image capturing is performed so that the angle α between two sight line vectors of the camera CM is close to 90 degrees. In the example of FIG. 8 (A), since the angle α is small, even when there is a slight error in the sight line vectors of the camera CM, the error between the actual target coordinates TZg and the calculated target coordinates TZgm is large. On the contrary, in the example of FIG. 8(B), since the angle α is close to 90 degrees, even when there is an error in the sight line vectors of the camera CM, the error between the actual target coordinates TZg and the calculated target coordinates TZgm is not very large. Therefore, an evaluation can be made that the closer to 90 degrees the angle θ is, the higher the accuracy is.

The three-dimensional shape data input portion 16 receives the three-dimensional shape data SD from the three-dimensional measurement instrument VD, and stores it into an appropriate memory area or the storage device 7.

Figure 3:
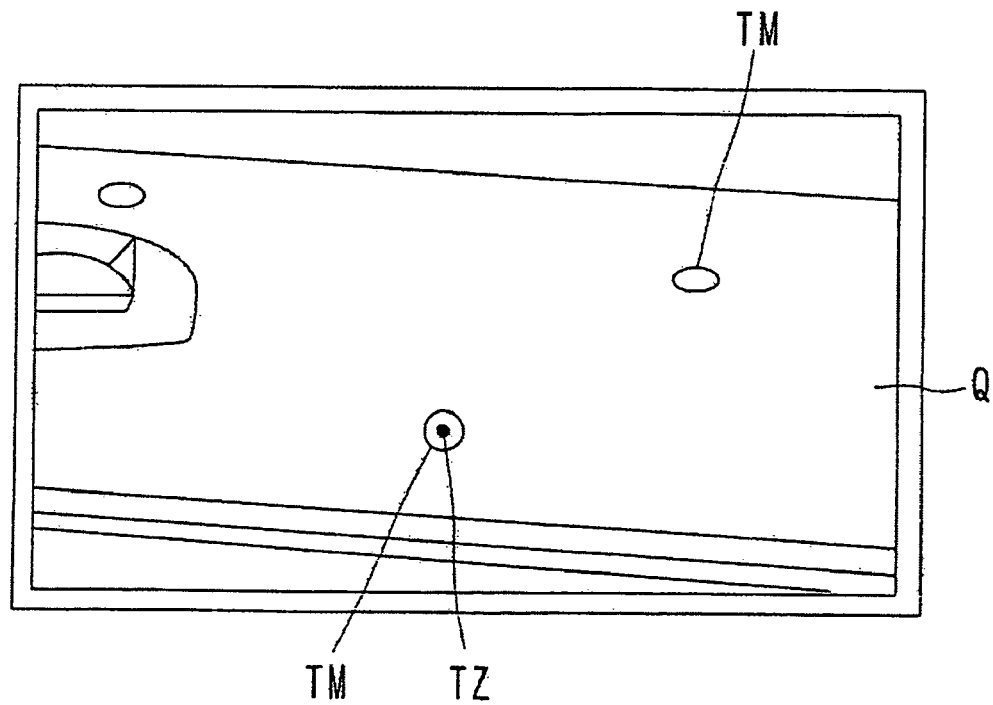
FIG. 3 is a view showing an example of the target marks.

The second target coordinate calculator 17 calculates the target coordinates TZs of the target marks TM which are the three-dimensional coordinate positions of the target marks TM based on the three-dimensional shape data SD. For example, the edge of the target mark TM is detected, and the three-dimensional coordinates (x, y, z) of a plurality of points on the edge are calculated. An appropriate circle is fitted to the edge. Whether the edge is the target mark TM or not is determined based on whether the diameter of the fitted circle is within a predetermined range or not. When the edge is determined to be the target mark TM, the coordinates of the central position of the fitted circle is determined to be the target coordinates TZs (see FIG. 3).

The second normal vector calculator 18 calculates the normal vector HVs of each target mark TM based on the three-dimensional shape data SD and the target coordinates TZs. For example, the normal vector HVs of the circle or the ellipse fitted to the edge in the calculation of the target coordinates TZs is calculated. With respect to the normal vector HVs, the direction from the measurement surface toward the three-dimensional measurement instrument VD is the positive direction.

Here, the normal vector obtained based on the three-dimensional shape data SD is, unlike the normal vector (average sight line vector) obtained by performing photogrammetry, the vector vertically extending from the central position of the target which vector is calculated based on the three-dimensional shape data SD, and is a geometrically defined normal vector itself.

The target coordinates TZs and the normal vector HVs may be obtained by using various other methods.

The correspondence determiner 19 determines the correspondence between the target coordinates TZg and the target coordinates TZs by using the target coordinates TZg and the normal vector HVg based on the photogrammetry by the camera CM and the target coordinates TZs and the normal vector HVs by the three-dimensional measurement instrument VD. That is, the target coordinates TZs that coincide with the target coordinates TZg are found out, and it is determined whether the normal vector HVg thereof and the normal vector HVs thereof coincide with each other or not. When the vectors coincide with each other, it is determined that the target coordinates TZg thereof and the target coordinates TZs thereof correspond to each other.

An example of the method for the determination will be shown below.

Figure 5:
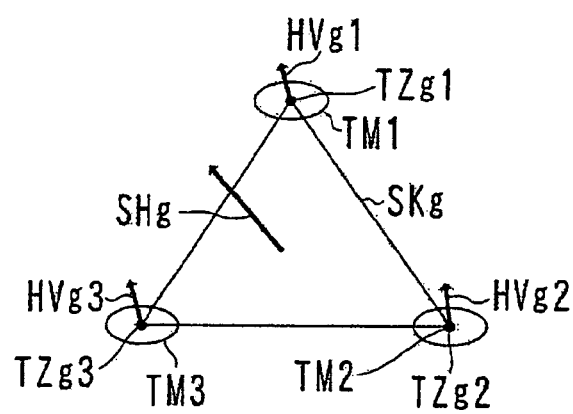
FIGS. 5(A) and 5(B) are views respectively showing examples of target coordinates and normal vectors.
Figure 5:
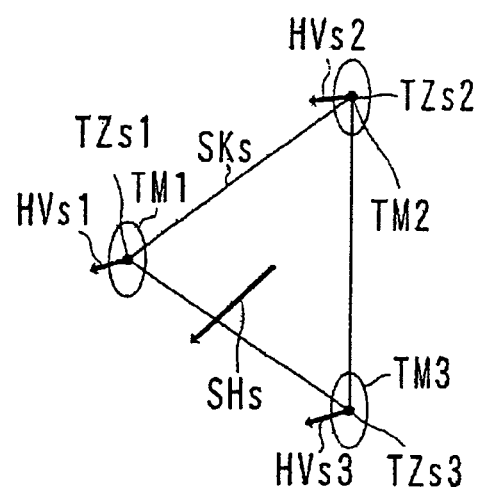

First, with respect to a multiplicity of target coordinates TZs obtained by the three-dimensional measurement instrument VD, three target coordinates TZs are selected. As shown in FIG. 5 (B), a triangle SKs is defined by the selected three target coordinates TZs. Each triangle SKs is defined by the target coordinates TZs which are three vertices. At this time, the normalized surface normal vector SHs of the triangle SKs is also obtained.

Then, three combinations of target coordinates TZg are obtained from among the target coordinates TZg obtained by photogrammetry, a triangle SKg is defined for all the combinations, and a triangle list SL is created. In the triangle list SL, with respect to the target coordinates TZg obtained by photogrammetry, the triangles SKg formed by all the combinations defined by the three target coordinates TZg are recorded. FIG. 5(A) shows one triangle SKg.

In FIG. 5 (A), the triangle SKg is defined by target coordinates TZg1 to TZg3 obtained from three target marks TM1 to TM3. Normal vectors HVg1 to HVg3 are shown at the target coordinates TZg1 to TZg3, respectively. The surface normal vector SHg of the triangle SKg is also shown.

In FIG. 5(B), the triangle SKs is defined by target coordinates TZs1 to TZs3 obtained from three target marks TM1 to TM3. Normal vectors HVs1 to HVs3 are shown at the target coordinates TZs1 to TZs3, respectively. The surface normal vector SHs of the triangle SKs is also shown.

One triangle SKs defined by the three target coordinates TZs is compared with each of the triangles SKg recorded in the triangle list SL, and an error value (e0) of each is obtained. For example, with respect to the two triangles SKg and SKs compared with each other, the amounts of shift (difference) between the three sides of the triangles SKg and SKs are obtained, and the sum of the shift amounts is designated the error value (e0).

Then, according to the error values (e0), the ranking of the triangles SKg in the triangle list SL is recorded. For example, the data of the triangles SKg in the triangle list SL is rearranged in order of increasing error value (e0). Thereby, with respect to the coincidence based on the target coordinates TZ, which triangle SKg has the highest coincidence with the triangle SKs is found. Instead of recording the ranking, it may be performed to record the error values (e0) or the like and indicate the ranking by the error values (e0).

Figure 6:
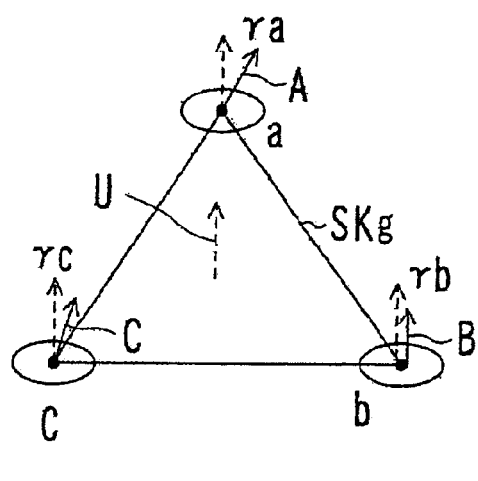
FIGS. 6(A) and 6(B) are views respectively showing examples of angles between the normal vectors and surface normal vectors.
Figure 6:
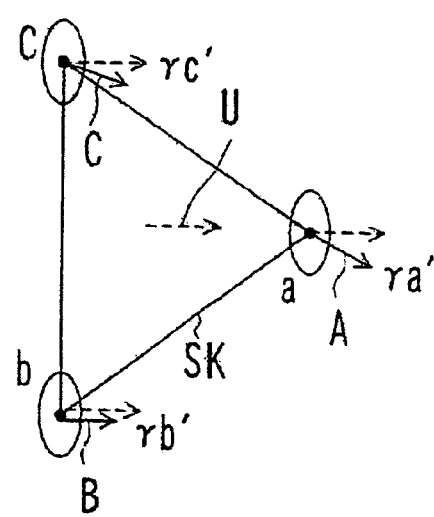

Then, with respect to each triangle SKg in the triangle list SL, the angles γa, γb and γc between the surface normal vector SHg of the triangle SKg and the normal vectors HVg of the target marks TM at the vertices of the triangle SKg are obtained. In FIG. 6 (A), one triangle SKg is shown, and the angles γa, γb and γc between the normal vectors A, B and C of the vertices a, b, and c and the surface normal vector U are shown. Here, the surface normal vector SHg and the normal vector HVg are both normalized.

With respect to the triangle SKs, the angles γa', γb' and γc' between the surface normal vector SHs and the normal vector HVs are similarly obtained. In FIG. 6(B), the triangle SKs is shown, and the angles γa', γb' and γc' between the normal vectors A, B and C of the vertices a, b, and c and the surface normal vector U are shown. Here, (γa, γa'), (γb, γb') and (γc, γc') are the angles between the normal vectors HV of the corresponding target marks TM and the surface normal vector SH of the triangle SK. The range of the angles γ is 0 to 90 degrees.

It is determined whether the triangles SKg in the triangle list SL coincide with the triangle SKs or not. As the criterion of this determination, various criteria may be used. In the present embodiment, the above-mentioned measurement accuracy is used to decide the criterion of the determination. Since the higher the measurement accuracy is, the more highly accurately the determination is performed, a rigorous criterion is used. When the measurement accuracy is low, since the determination is difficult, a lenient criterion is used.

Therefore, for example, the shift of the angle with respect to the triangle of the target marks TM is used as the criterion. That is, f and g are defined as follows:

$$f=[\cos(\gamma a-\gamma a')+\cos(\gamma b-\gamma b')+\cos(\gamma c-\gamma c')]/3 \quad (1)$$

$$g=f-\cos(\beta) \quad (2)$$

In this case, h expressed by the following expression (3) is used as the evaluation coefficient HK:

$$h=e0-g^2 \quad (3)$$

Here, e0 is the above-mentioned error value. The smaller the difference between the error value e0 and $g^2$ is, the higher the coincidence is. Therefore, the combination where h is smallest is determined to be the coinciding triangle. Here, using the above-mentioned angle θ, β is defined as follows:

$$\beta=\theta+10 \quad (4)$$

Here, β=90 when β>90.

As described above, it is in order to ease the criterion of the accuracy that β=+10. That is, to ease the criterion, ten degrees are added with respect to the accuracy of photogrammetry.

In the expression (1), γa and γa' coincide with each other at the corresponding target marks TM. That is, f is an index of coincidence using the normal vectors HV of the target marks TM. When f=1, the target marks TM completely coincide in correspondence.

When g<0, g=0. That is, when the accuracy of photogrammetry is high (when β is close to 90 degrees), cos β is close to 0. That is, when the accuracy of photogrammetry is high, g is close to f as is apparent from the expression (2). When the accuracy of photogrammetry is low, since cos(β) is close to 1, g is close to 0.

In the expression (3), g is squared for the balance of the order with the error value e0.

As described above, the evaluation coefficient HK is h expressed by the expression (3). In this case, the lower the evaluation coefficient HK is, the higher the coincidence is. However, the present invention is not limited thereto. With respect to the evaluation coefficient HK and the criterion of the determination and the like, various appropriate ones may be defined.

FIG. 7 shows an example of a triangle list SL1. In the triangle list SL1 of this example, the triangle SKg is defined by three vertices 1 to 3. The vertices are defined by the target coordinates TZg and the normal vectors HVg. With respect to the normal vectors HVg of the vertices, whether they coincide with the normal vectors HVs of the compared triangle SKs or not and the degree of coincidence are recorded. The surface normal vector SHg of the triangle SKg, the error value e0 and the evaluation coefficient HK are also recorded.

In the triangle list SL1, data is written by the processing at the correspondence determiner 19. From the triangle list SL1, one triangle SKg is determined to correspond based on the evaluation coefficient HK. With respect to the triangle SKg determined to correspond, the correspondence with the triangle SKs is recorded. For any triangle SKg, when the evaluation coefficient HK is low (high), a signal notifying this is outputted from the alarm output portion 20. Examples of the signal include a message signal for display on the display surface of the display 5, a voice signal for notification by voice, and an output signal for transmission to an external apparatus. By such a signal, an alarm is issued that the evaluation coefficient HK is lower than a predetermined threshold value, that is, the reliability is low in the determination of the reliability of the correspondence.

In this manner, the correspondence between the target coordinates TZg and the target coordinates TZs is determined by the correspondence determiner 19. After the correspondence of the target coordinates is determined, a coordinate transformation matrix where the corresponding target coordinates coincide is obtained.

That is, a coordinate transformation matrix where the target coordinates TZs obtained by the three-dimensional measurement instrument VD and the target coordinates Tzg obtained by photogrammetry coincide with each other is obtained by the coordinate transformer 21.

The data integrator 22 transforms, by using the coordinate transformation matrix obtained by the coordinate transformer 21, a plurality of pieces of three-dimensional shape data SD obtained by the three-dimensional measurement instrument VD so as to coincide with the target coordinates TZg obtained by photogrammetry, thereby integrating the pieces of data into one piece of three-dimensional shape data SD. In the integration of the three-dimensional shape data SD, for the overlapping parts of a plurality of pieces of three-dimensional shape data SD, various methods may be applied such as obtaining the root-mean-square of the pieces of three-dimensional shape data. SD. The integrated three-dimensional shape data SD is the three-dimensional shape model MD of the object Q.

Figure 9:
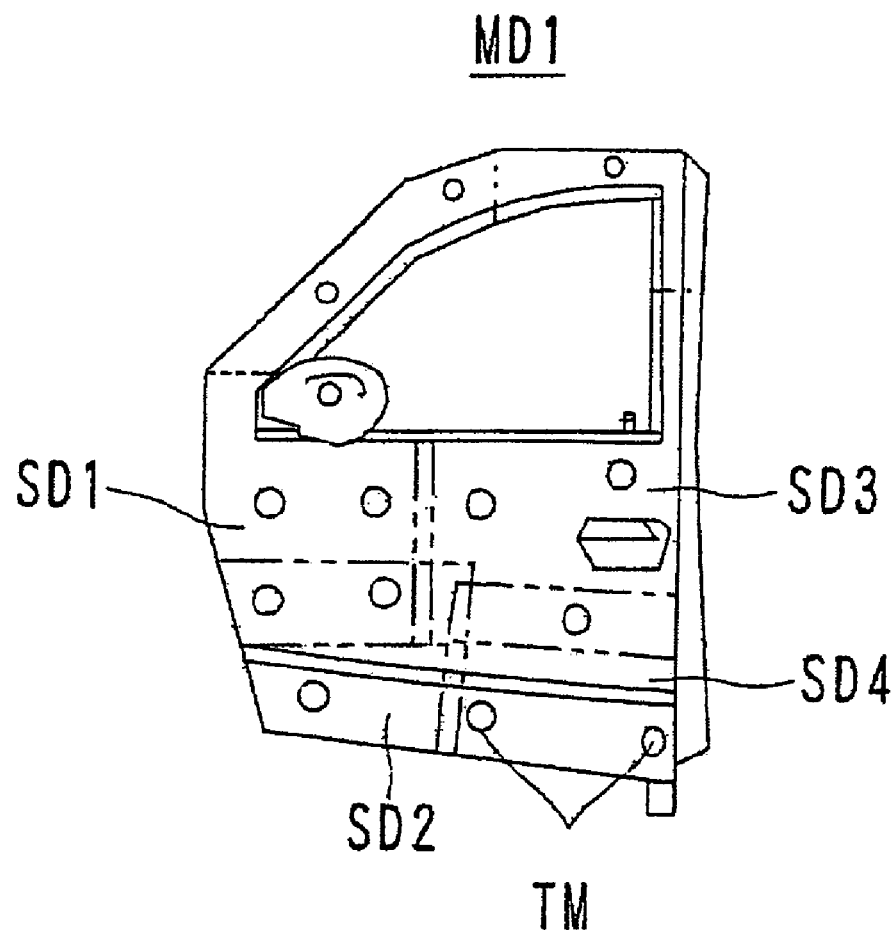
FIG. 9 is a view showing an example of a generated three-dimensional shape model.

FIG. 9 shows an example of a three-dimensional shape model MD1 generated by integrating a plurality of pieces of three-dimensional shape data SD1, SD2 and SD3.

The three-dimensional shape model output portion 23 displays the generated three-dimensional shape model MD on the display 5, or outputs it to an external apparatus.

Then, the procedure of the generation of the three-dimensional shape model MD in the three-dimensional shape model generating system 1 will be described with reference to flow-charts.

Figure 10:
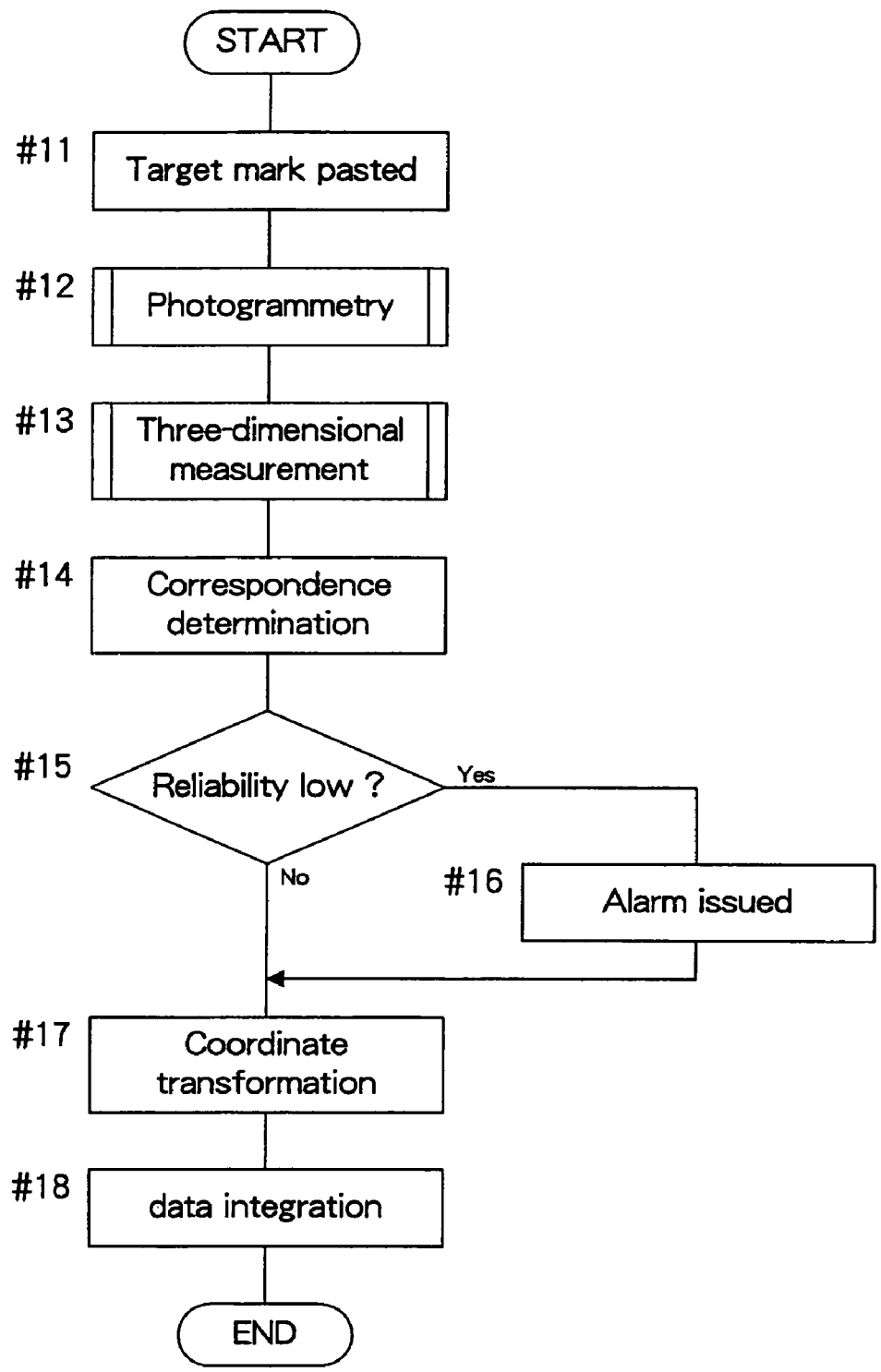
FIG. 10 is a flowchart showing the processing to generate the three-dimensional shape model.
Figure 11:
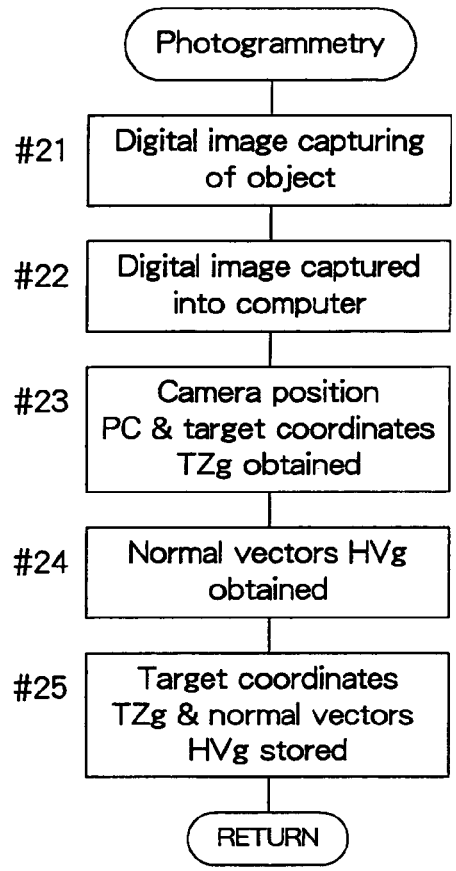
FIG. 11 is a flowchart showing the procedure of photogrammetry.
Figure 12:
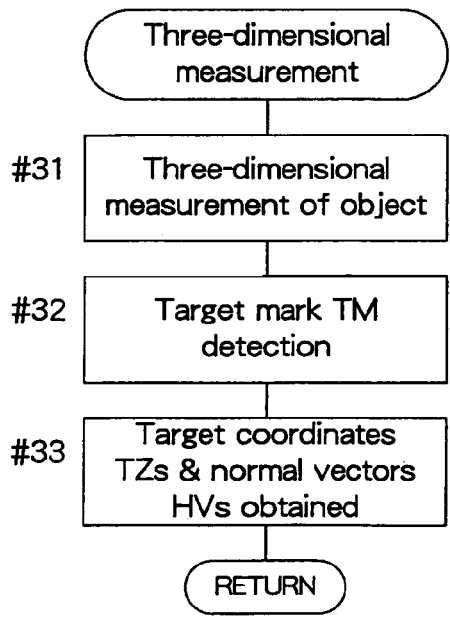
FIG. 12 is a flowchart showing the procedure of the three-dimensional measurement.

FIG. 10 is a flowchart showing the processing to generate the three-dimensional shape model. FIG. 11 is a flowchart showing the procedure of photogrammetry. FIG. 12 is a flowchart showing the procedure of the three-dimensional measurement.

In FIG. 10, first, the target marks TM are pasted to the object Q (#11). Photogrammetry is performed (#12). Three-dimensional measurement is performed (#13). With respect to the obtained target coordinates TZ, the correspondence is determined by using the target coordinates TZ and the normal vectors HV (#14). When the reliability of the correspondence is determined to be low, an alarm is issued (#15, #16). With respect to the three-dimensional shape data SD, the coordinate transformation is performed based on the correspondence (#17), and the three-dimensional shape data SD is integrated to generate the three-dimensional shape model MD (#18). In the coordinate transformation of the three-dimensional shape data SD, the normal vectors HV are not used although the target coordinates TZ are used.

In FIG. 11, in the photogrammetry, the image of the object Q is captured from various positions and angles by the camera CM to obtain a multiplicity of digital images (image data GD) (#21). The digital images are captured into a computer (processor 3) (#22). The camera position PC and the target coordinates TZg are obtained (#23). The normal vectors HVg of the target marks TM are obtained (#24). The obtained target coordinates TZg and normal vectors HVg are stored into a memory for storage (#25).

In FIG. 12, in the three-dimensional measurement, the object Q is measured by the three-dimensional measurement instrument VD (#31). From the three-dimensional shape data SD obtained by the measurement, the parts of the target marks TM are detected (#32). The target coordinates TZs and the normal vectors HVs are obtained (#33).

According to the above-described embodiment, in the determination of the correspondence between the target coordinates TZg obtained by photogrammetry and the target coordinates TZs obtained by the three-dimensional measurement, not only the target coordinates TZg and TZs but also the normal vectors HVg and HVs of the target marks TM are used. Therefore, although the possibility that the correspondence is misdetermined is high when a plurality of target coordinates have a similar positional relationship according to the conventional method, according to the present invention, the correspondence can be accurately determined, and the robustness in determining the correspondence among the target marks TM improves.

In the above-described embodiment, the angle between two sight line vectors in the image capturing by the camera CM is used as the parameter for determining the evaluation coefficient HK and the criterion of the determination. An example of methods other than this will be described.

Figure 13:
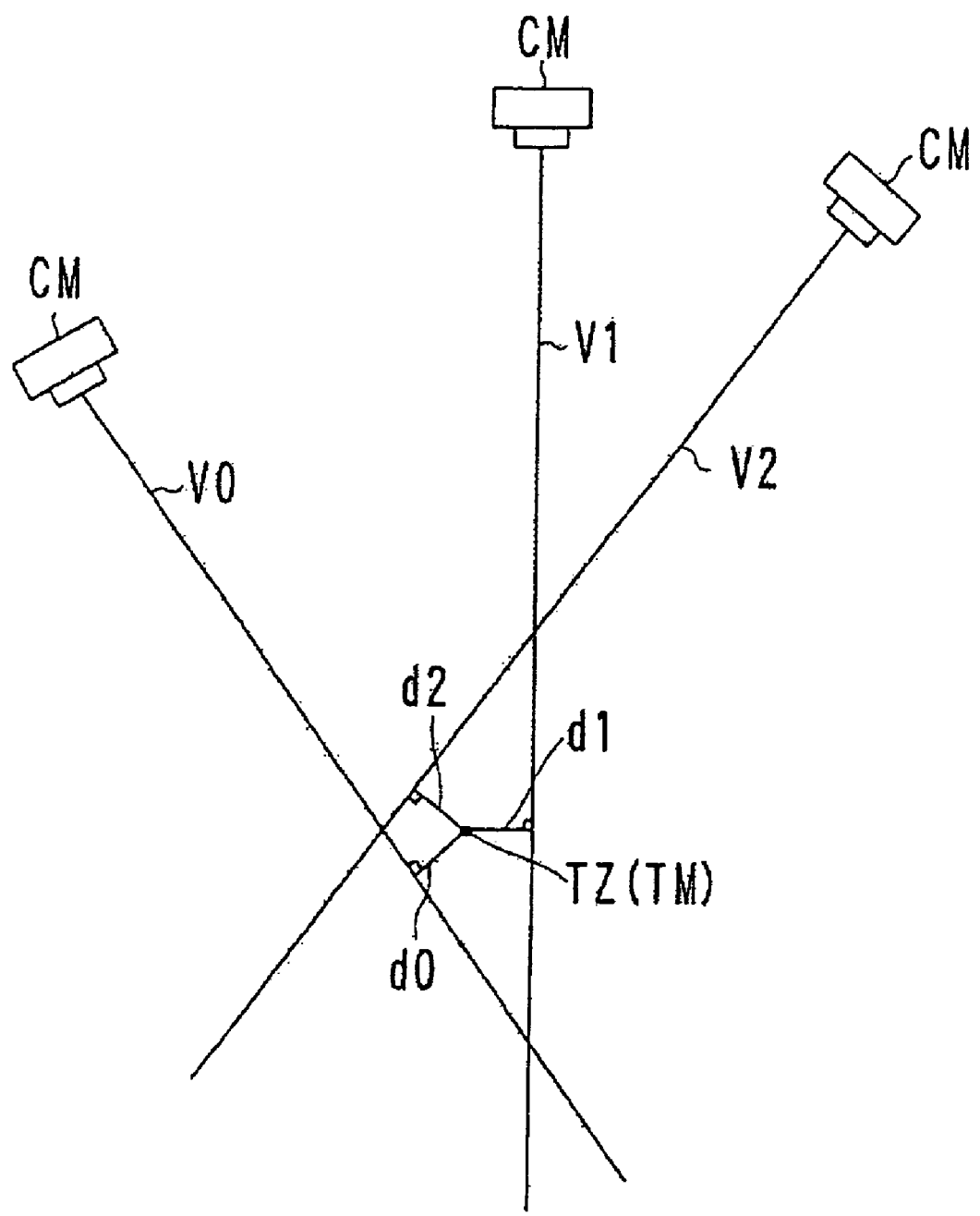
FIG. 13 is a view for explaining sight line vectors, the target coordinates and distances.
Figure 14:
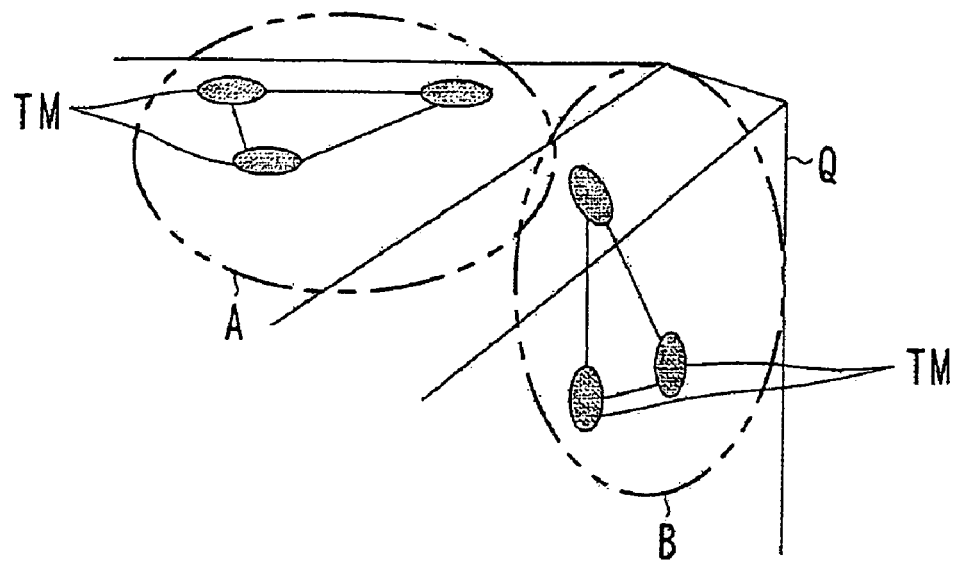
FIGS. 14(A) and 14(B) are views for respectively explaining the problem that arises in determining the correspondence among the target marks according to the conventional method.
Figure 14:
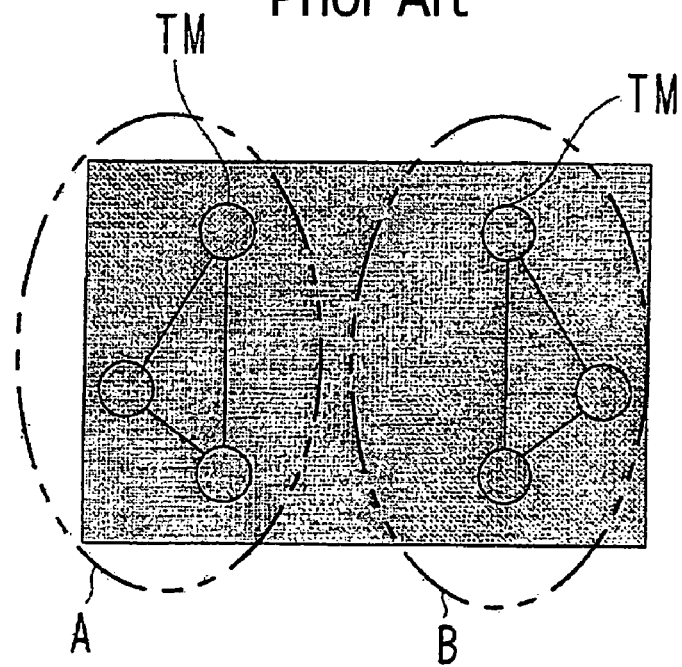

For example, as shown in FIG. 13, the distances d1, d2, d3, . . . between the sight line vectors V0, V1, V2, V3, . . . toward the target marks TM and the calculated target coordinates TZ are obtained. The average value, the highest value or the root-sum with respect to the obtained distances d1, d2, d3, . . . is used as the parameter representative of the measurement accuracy.

Alternatively, the distances d1, d2, d3, . . . converted into pixel shift amounts on the image sensing surface (for example, the CCD surface) of the camera CM may be used. The target coordinates TZ are projected onto the image sensing surface situated in the camera positions PC, and using the pixel shift amounts dp0, dp1, dp3, . . . between the positions of the target marks TM obtained by image capturing by the camera and the positions of the target marks TM obtained by the projection, the average value, the highest value or the root-sum thereof is used as the parameter representative of the measurement accuracy.

The number N of images used when the target coordinates TZg are obtained may be used as the parameter representative of the measurement accuracy. These various methods may be combined. The evaluation value HK, the angle and the threshold value may be calculated by various methods.

In the above-described embodiment, as the shape of the target marks TM and the method of attaching the target marks TM to the object Q, various ones may be adopted as well as the above-mentioned ones.

The structure, construction, configuration, number, processing contents or order of the whole or each part of the processor 3 and the three-dimensional shape model generating system 1 may be changed as appropriate according to the purport of the present invention.

The present invention is applicable to generate a three-dimensional shape model of various objects Q such as industrial apparatuses, daily necessities and buildings.

Although the present invention has been fully described by way of examples with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A method for aligning three-dimensional shape data in a three-dimensional shape model generating system, said three-dimensional shape model generating system including a camera, a three-dimensional measurement device, and a processor, the method comprising the steps of:

performing photogrammetry with said camera of an object having a multiplicity of target marks thereon to obtain a three-dimensional position and an average sight line vector of each of the target marks by a calculation;

performing the three-dimensional measurement of the object with said three-dimensional measurement device to obtain a three-dimensional position and a normal vector for each of the target marks;

determining, utilizing said processor, a correspondence between the three-dimensional position of each of the target marks obtained by the photogrammetry and the three-dimensional position of each of the target marks obtained by the three-dimensional measurement, by using the three-dimensional position and the average sight line vector of each of the target marks obtained by the photogrammetry and the three-dimensional position and the normal vector of each of the target marks obtained by the three-dimensional measurement; and aligning, utilizing said processor, the three-dimensional shape data obtained by the three-dimensional measurement based on the correspondence between the three-dimensional positions of the target marks.

2. The method for aligning three-dimensional shape data as claimed in claim 1, wherein of the multiplicity of target marks, three target marks are selected, and the correspondence is determined for the group of selected three target marks.

3. The method for aligning three-dimensional shape data as claimed in claim 1, further comprising the steps of:

calculating, utilizing said processor, an evaluation coefficient related to the accuracy of the three-dimensional position of the target mark obtained by the photogrammetry; and determining, utilizing said processor, the reliability of the correspondence by applying the evaluation coefficient.

4. The method for aligning three-dimensional shape data as claimed in claim 3, farther comprising the step of:

outputting, utilizing said processor, a signal representing that the reliability is lower than a set threshold.

5. An apparatus for aligning three-dimensional shape data obtained by performing a three-dimensional measurement of an object, said apparatus comprising:

a processor and a memory, wherein the processor is programmed to:

calculate a first three-dimensional position and average sight line vector of a target mark based on image data obtained by performing photogrammetry of an object provided with the target mark;

calculate a second three-dimensional position and a normal vector of the target mark based on three-dimensional shape data obtained by performing a three-dimensional measurement of the object;

determine a correspondence between the first three-dimensional position and the second three-dimensional position, by using the first three-dimensional position, the average sight line vector, the second three-dimensional position, and the normal vector; and perform a coordinate transformation of the three-dimensional shape data obtained by the three-dimensional measurement so as to coincide with the first three-dimensional position obtained by the photogrammetry.

6. The aligning apparatus as claimed in claim 5, wherein said processor is further programmed to:

calculate an evaluation coefficient related to the accuracy of the first three-dimensional position; and determine the reliability of the correspondence by applying the evaluation coefficient.

7. The aligning apparatus as claimed in claim 6, wherein said processor is further programmed to:

output a signal representing that the reliability of the correspondence is lower than a set threshold.

* * * * *

UNITED STATES PATENT AND TRADEMARK OFFICE
CERTIFICATE OF CORRECTION

PATENT NO.       : 7,684,613 B2                                          Page 1 of 1
APPLICATION NO.  : 11/439338
DATED            : March 23, 2010
INVENTOR(S)      : Koji Harada et al.

It is certified that error appears in the above-identified patent and that said Letters Patent is hereby corrected as shown below:

Column 12:
Line 2 claim 4, delete "farther" and insert -- further --.

Signed and Sealed this

Eighteenth Day of May, 2010

David J. Kappos
*Director of the United States Patent and Trademark Office*